Patented Oct. 22, 1935

2,018,507

UNITED STATES PATENT OFFICE 2,018,507

DRY CLEANING COMPOSITION AND PROCESS

William H. Alton, New York, N. Y., assignor to R. T. Vanderbilt Company, Incorporated, New York, N. Y., a corporation of New York No Drawing. Application December 7, 1934, Serial No. 756,473

4 Claims. (Cl. 210—203)

This invention relates to a new dry cleaning composition and process, and more particularly a composition adapted for use in filtering and purifying dirty dry cleaning solutions, and a process of purifying such solutions.

In the present system of so-called "dry cleaning", it is customary to place several garments in a metal drum such as used in laundries and fill the drum about one-third full of solvent naphtha or cleaner's naphtha, after which the drum is rotated several turns in one direction and then reversed automatically for several turns in the opposite direction, thus tending to force the naphtha back and forth through the clothes.

In carrying out such a dry cleaning process, after the first few turns of the drum, the drum is opened and about a quart of so-called "moisture" is added. This "moisture" consists of a mixture of ammonia and water and is important in the proper cleaning of the cluthes. Shortly after the "moisture" is added, and after a further short period of operation, the drum is again opened, and a suitable amount of dry powder, suitable as a filtering medium, is added and allowed to swish back and forth with the naphtha between and among the clothes for a short period, for example, about ten minutes, by which time the naphtha has turned into a very dirty and discolored solution, and the clothes are ready for rinsing in clean fresh naphtha. The amount of dry powder added will vary somewhat with the nature of the powder and with the amount of solvent naphtha used but for an ordinary commercial dry cleaning system the amount may be, for example, around 5 quarts of the dry powder.

In order to carry out the rinsing of the clothes, a circulating pump is started and the discolored naphtha is circulated through a pressure filter, or other filter, where it is filtered clean and sent back to perform its office in the drum, and the naphtha is so circulated until the clothes are both washed and rinsed in the clean naphtha.

A typical pressure filter, such as is commonly used in this process, is made up of a steel cylinder fitted inside with several horizontal filter leaves made of Monel metal screen cloth, and with a discharge pipe at the lower end leading into a drain which drains back into the clothes washer, or into a storage tank as desired. While the pump is pumping the dirty naphtha from the washing machine through the filter, the filter medium is carried along and deposited on the filter screen in a layer which acts as a filter coat or layer and makes possible sufficient filtration to remove the dirt and lint from the naphtha. Additional filtering medium is added to each fresh batch of clothes and naphtha until about four batches have been treated, when the thickness and nature of the cake formed on the filter leaves makes it difficult to effect further circulation and filtration, the pressure increasing, for example, to around 60 pounds for forcing the naphtha through the filter. When further filtration is thus prevented, the filter must be opened up and the filter cake scraped from the filter leaves.

The type of filter earth heretofore commonly used has been some form of earth or clay of an absorbent nature whirch has reacted with or which absorbs or combines with the water content of the "moisture", above referred to, so that it becomes more or less plastic and sticky, and clogs up the openings in the Monel metal cloth or screen of which the filter leaves are made. This requires that the filter be shut down about every four batches and the leaves removed and scraped, with consequent loss of time in operation and labor.

According to the present invention, the objection to the use of such filtering earths or clays is largely overcome or obviated, and an improved result is obtained by using a special filtering composition which enables the filter to be used for a much longer period of time before it requires shutting down and cleaning so that, for example, the capacity of the dry cleaning machine can be practically doubled before shutting down and cleaning of the filters is required.

The new composition used according to the present invention is made up of graded sizes of material which is non-absorbent, or absorbs very little water. The material which is particularly advantageous, when prepared in a graduated scale of fineness, is the mineral pyrophyllite. In its broader aspects, the invention includes other materials such as talc, slate, soapstone, steatite, vermiculite, mica, etc.

The provision of such a material in graded sizes, or with a graduated scale of fineness, is important. The larger sizes are held back by the filter cloth and build up a porous and easy filtering foundation next to the filter leaf, and the finer particles, of a fineness such that they would otherwise pass through the filter cloth, are held back by the foundation of larger particles and form a filling on top of them which secures a fine straining action on the passing liquid.

A standard size of filter cloth or screen used in such pressure filters has a mesh of about 110 by 27. With such a screen a pyrophyllite powder having the following screen analysis is advantageous:

| | Per cent |
|---|---|
| Retained on 60 mesh screen | 2 |
| Retained on 80 mesh screen | 6 |
| Retained on 100 mesh screen | 10 |
| Retained on 200 mesh screen | 22 |
| Passing 200 mesh screen | 60 |

The use of such a pyrophyllite composition, of graduated scale of fineness, enables the same filter to be used for from eight to ten batches before requiring to be cleaned, and therefore enables the capacity of the machine to be practically doubled, with corresponding saving in time and labor in the carrying out of the dry cleaning process and in the cleaning of the filters.

The particular sizes of the filtering material, in the new filtering composition, can be somewhat varied, as well as the percentages of the different sizes, but it is important to have present in the new composition, larger sizes which will build a porous and easy filtering foundation next to the filter leaf as well as finer particles which will fill in on top and insure a fine straining action on the passing liquid, so as to insure the removal of dirt, etc. therefrom. In operation, it will be understood that the recirculating of the naphtha from the washing machine through the filter and back to the washing machine may involve the recirculation of some of the fine filtering material while the foundation layer is being built up on the filter leaves, but that the continued recirculation will insure the holding back by the filter of even the fine particles of filtering material and will result in a fine straining action for purifying the naphtha.

The use of the new filtering composition, and the carrying out of the process, are not confined to pressure filters, since suction and gravity filters can also be used, the coarser particles of the filter medium, coarser than the mesh of the screen, forming a foundation layer, and the finer particles being held by this foundation layer and insuring a fine straining action on the naphtha passing the filter.

I claim:

1. In the dry cleaning of fabrics, with cleaning of the dirty dry cleaning liquid by circulating through a filter, the improvement which comprises adding to the dirty dry cleaning liquid a filtering material in the form of graded sizes of a material which absorbs little water, and passing the resulting liquid and admixed filtering material through the filter whereby the larger sizes of the graded material build up a filtering foundation supporting the finer particles which insure a fine straining action on the passing liquid.

2. In the dry cleaning of fabrics, with cleaning of the dirty dry cleaning liquid by circulating through a filter, the improvement which comprises adding to the dirty dry cleaning liquid a filtering material in the form of graded sizes of pyrophyllite which absorbs little water, and passing the resulting liquid and admixed filtering material through the filter whereby the larger sizes of the graded pyrophyllite build up a filtering foundation supporting the finer particles which insure a fine straining action on the passing liquid.

3. A new filtering composition for filtering dry cleaning liquids, said composition being made up of particles of pyrophyllite of a graduated scale of fineness, the particle sizes being selected so that, on screen analysis, approximately 2% are retained on a 60 mesh screen, 6% on an 80 mesh screen, 10% on a 100 mesh screen, 22% on a 200 mesh screen, and 60% pass a 200 mesh screen.

4. A new filtering composition for filtering dry cleaning liquids, said composition being made up of particles of pyrophyllite of a graduated scale of fineness, the particle sizes being selected so that the major portion will pass a 200 mesh screen and at least a portion thereof will be retained on an 80 mesh screen.

WILLIAM H. ALTON.